United States Patent [19]

Oki

[11] Patent Number: 4,622,793
[45] Date of Patent: Nov. 18, 1986

[54] MOVEMENT-REGULATING MECHANISM FOR A SEALING DEVICE

[75] Inventor: Yasuo Oki, Tomioka, Japan

[73] Assignee: Orihiro Co. Ltd., Japan

[21] Appl. No.: 723,096

[22] Filed: Apr. 15, 1985

[30] Foreign Application Priority Data

Nov. 27, 1984 [JP] Japan .......................... 59-178696[U]

[51] Int. Cl.4 .................... B65B 51/30; B65B 51/14
[52] U.S. Cl. ........................................ 53/373; 53/551;
74/48; 74/600; 74/833; 74/837; 156/583.1
[58] Field of Search ............... 53/551, 552, 554, 555,
53/373; 156/583.1; 74/833, 837, 600, 48, 50

[56] References Cited

U.S. PATENT DOCUMENTS

| 982,545 | 1/1911 | Sutherland et al. | 74/600 |
| 1,369,164 | 2/1921 | Christopher | 74/600 X |
| 1,614,554 | 1/1927 | Hohn | 74/48 |
| 2,899,870 | 8/1959 | Gack | 74/600 X |
| 3,266,216 | 8/1966 | van den Bos | 53/551 |
| 3,332,205 | 7/1967 | Swede | 53/551 |
| 4,262,470 | 4/1981 | Reuter et al. | 53/551 X |
| 4,506,494 | 3/1985 | Shimoyama et al. | 53/551 |

Primary Examiner—Horace M. Culver

[57] ABSTRACT

The invention is a mechanism for regulating the speed and stroke of a transverse sealing means for a vertical packing machine using tubular film. The mechanism comprises a cranking disc, and elongated transverse rod and a vertical rod, these members being connected adjustably to each other to regulate the movement of the transverse sealing means.

5 Claims, 2 Drawing Figures

MOVEMENT-REGULATING MECHANISM FOR A SEALING DEVICE

FIELD OF THE INVENTION

The invention relates to a mechanism for regulating the speed and stroke of a transverse sealing device in a vertical packing machine.

DESCRIPTION OF THE PRIOR ART

In conventional vertical packing machines, as shown in FIG. 2, a tubular film 1 formed in a tubular form at a bag-forming and vertical-sealing means (neither means being shown) is successively sent downward through feed rolls 2. The tubular film 1 is first transversely sealed at its bottom end by a transverse sealing device 3 to form an empty bag of the tubular film 1. A changing pipe 4 for charging a product to be packed is disposed inside the empty bag of the tubular film 1. While the tubular film 1 is moved downward through the feed rolls 2, the tubular film 1 is simultaneously charged with the product 5 to be packed, that is discharged from the charging pipe 4, the tubular film 1 being moved downward by the rotation of the feed rolls 2.

The product 5 in the tubular film 1 is separated into an amount for one pack at a time, the timing and interval being appropriately set by a squeeze-separation device 6 according to the pitch length and content for a predetermined amount. The squeeze-separation device 6 can separate a product into large or small bag form, or long or short pitch form depending on the predetermined time, timing and interval mentioned above.

Turning to the timing set by the squeeze-separation device 6, the transverse sealing device 3 repeats a successive and constant up-and-down movement, as shown by arrows A, through a cranking device 7, thereby performing sealing depending on the speed in the downward direction of the transverse sealing device 3.

Conventional sealing devices such as the one described above, have the following problems:

1. Since conditions for forming and sealing the bag is the same for a product of either long or short pitch, i.e. even though the length of the bag is different, sealing becomes uneven for a long pitch product, i.e. when the content in the bag is large.
2. The time for making (or sealing) the bag is the same for both long and short pitch products.
3. In order to strengthen the sealed portion, the speed in the downward direction both of the bag and the sealing device must be reduced, therefore requiring special means.
4. The frequency of sealing is limited.
5. Sealing for packing heavy products is uneven.
6. Transverse sealing at large lengths (for bags having large widths) is uneven.
7. Changes in sealing time are impossible.
8. Sealing time is limited due to the mechanism of the raising and lowering crank.
9. Matching the film-feeding speed with the sealing speed is impossible.
10. A heater portion contacts the sealed portion of the bag when the sealing time is lengthened, thereby possibly breaking the bag.

SUMMARY OF THE INVENTION

The invention provides a transverse sealing device which solves the above problems because the speed for raising and lowering the sealing device is the same and constant, wherein both the ascending speed and the descending speed of the sealing device are independently and optionally set, and the descending speed of the sealing device is matched to the descending speed of the tubular film, the ascending speed of the sealing device being set to two or three times the descending speed thereof, thereby providing a longer descending time, so that the time for transverse sealing is fixed for any desired length, and particularly the transverse sealing of a heavy product in a long pitch bag can be performed evenly.

DETAILED DESCRIPTION OF THE INVENTION

The invention which solves the above problems is a movement-regulating mechanism for a transverse sealing device, comprising a rotatable cranking disc provided with a crank pin which is installed movably in the radial direction, an elongated transverse rod having formed in its lengthwise direction an elongated slot which is slidably engaged with the crank pin, a support shaft which rotatably supports the transverse rod at a predetermined location, a vertical rod which is connected to the transverse rod movably in the lengthwise direction thereof at a location closer to the support shaft than the location of engagement of the transverse rod with the crank pin, and a transverse sealing means which is installed on the vertical rod.

In the invention, both the ascending and descending speeds and the stroke of the transverse sealing means can be optionally set by changing the locations of engagement of both the cranking pin and the vertical rod with the transverse rod and also by changing the rotating speed of the cranking disc, so that the transverse sealing in a vertical packing machine can always be performed optimally depending on the packing conditions. Further, when the pitch of the bags is fixed, it is possible to secure the crank pin 12 with the screw 12a (see FIG. 1).

The invention will be described in more detail by way of an example with reference to the accompanying drawing.

Figure 1:
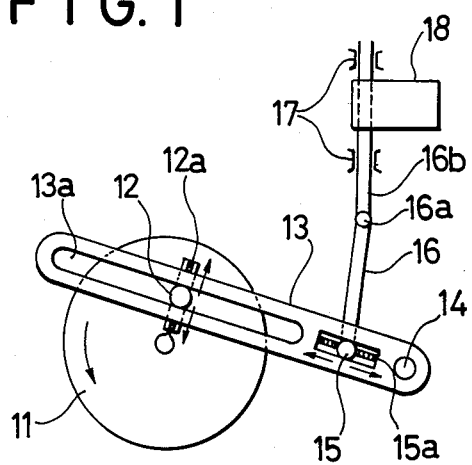
FIG. 1 is an elevation of the invention.
Figure 2:
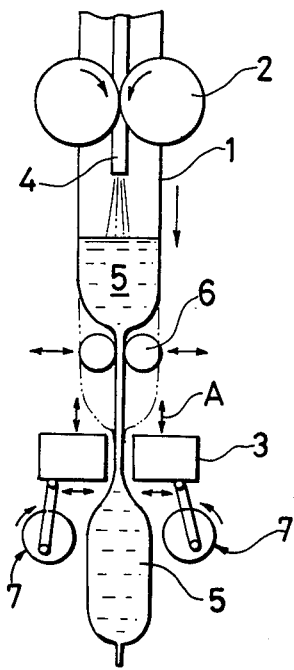
FIG. 2 is a plan view of a vertical packing machine provided with a conventional transverse sealing device.

FIG. 1 shows an example of the invention, wherein the crank pin 12 is attached to the cranking disc 11 movably in the radial direction by the rotation of the screw 12a (which acts as radial movement means for the pin 12). The transverse rod 13 having an elongated planar shape is formed with the elongated slot 13a extending in the lengthwise direction, one end of the transverse rod 13 is rotatably supported by the support shaft 14 at a predetermined location. The elongated slot 13a of the transverse rod 13 is slidably engaged with the crank pin 12 of the cranking disc 11. Also the lower vertical rod 16 is rotatably connected to the transverse rod 13 at its support shaft 14 side through the pivot 15. The pivot 15 is movable in the lengthwise direction of the transverse rod 13 by the thread 15a (which acts as a longitudinal movement means for the pivot 15). The lower vertical rod 16 is at its upper end connected to the upper vertical rod 16b via the rotatable connecting point 16a. The upper vertical rod 16b is supported by the supports 17,17 for movement in the vertical direction, and the transverse sealing means 18 is mounted on the upper vertical rod 16b. The lower vertical rod 16 may also be attached to the transverse rod 13 at the side of the support shaft 14 (not shown) opposite the engagement point of the crank pin 12.

When a bag-packed product is produced using the above device, the conditions and speed of sealing are set by changing the ascending and descending speeds of transverse sealing means 18 through a change in the rotational speed of the cranking disc 11. The ascending speed is set higher by positioning the crank pin 12 at a radially outer location on the disc 11, and is set lower by positioning the crank pin 12 at a radially inner location on the disc 11. On the other hand, the ascending-descending stroke of the transverse sealing means 18 can be changed by moving the pivot 15. For example, moving the pivot 15 closer to the support shaft 14 makes the stroke smaller while moving it in the opposite direction makes the stroke larger. The descending speed is lower in the former and higher in the latter.

In this way, the crank pin 12 and pivot 15 are positioned as required and the rotation of the cranking disc 11 is set to a required speed so that the ascending-descending stroke of the transverse sealing means is set to an optimum value for the length of the bag-packed product. Further, the descending speed of the transverse sealing means 18 can be set to an optimum value for the tubular film material in order to obtain the required sealing time.

As mentioned above, according to the invention, in the transverse sealing of a bag-packed product using tubular film, either a long or short pitch bag can be sealed under a variety of conditions so that sealing is performed evenly and without differences in the bag-forming speed. The invention can meet the requirement of reducing the sealing speed to increase the sealing strength, and can optionally set the sealing time depending on the film materials so that strong seals can be obtained. The frequency of sealing can be greatly increased by appropriately adjusting the rotating speed of the cranking disc and the stroke of the transverse sealing means, and transverse sealing of long length can be evenly performed by appropriately selecting the sealing time.

As it will be understood that embodiments of the invention can be constructed in widely different modes without departure from the spirit and scope of the invention, the invention is not limited to any specific mode of embodiment except as defined in the accompanying claim.

What is claimed is:

1. A movement-regulating mechanism for a transverse sealing device having transverse sealing means, comprising:

a cranking disc with a center of rotation, said cranking disc being mounted for rotation at a fixed location about its center or rotation;

a crank pin mounted for movement in a radial direction to said cranking disc;

radial movement means connected to said crank pin for moving said crank pin to adjustable radial positions on said cranking disc;

a transverse rod having having an elongated longitudinal direction, said transverse rod having an elongated slot extending in said longitudinal direction for slidably receiving said crank pin;

a support shaft operatively connected to said transverse rod at a location spaced from said longitudinal slot thereof, for pivotally supporting said transverse rod so that, with rotation of said cranking disc, said crank pin slides in said elongated slot to pivot said transverse rod;

a pivot connected to said transverse rod for sliding movement in the longitudinal direction of said transverse rod;

longitudinal movement means connected to said pivot for moving said pivot to selected longitudinal positions with respect to said transverse rod, said pivot always being from said support shaft;

a vertical rod pivotally connected to said pivot and movable in a vertical direction by pivoting of said transverse rod, said vertical rod being connected to the transverse sealing means for vertical up and down movement of the transverse sealing means; and guide means for guiding said vertical rod for movement in the vertical direction.

2. A movement-regulating mechanism according to claim 1, wherein said vertical rod comprises a lower rod portion having a lower end pivotally connected to said pivot at an upper end, an upper rod portion having a lower end pivotally connected to said upper end of said lower rod portion, said upper rod portion being engaged with said guide means for vertical up and down movement and said upper rod portion being directly connected to the transverse sealing means.

3. A movement-regulating mechanism according to claim 2, wherein said vertical movement means comprises a screw rotatably mounted to said cranking disc and threadably engaged with said crank pin, said screw being rotatable for moving said crank pin radially with respect to said cranking disc.

4. A movement-regulating mechanism according to claim 2, wherein said longitudinal movement means comprises a screw threadably mounted to said transverse rod and threadably engaged with said pivot, rotation of said screw causing longitudinal movement of said pivot with respect to said transverse rod.

5. A movement-regulating mechanism according to claim 4, wherein said radial movement means includes a further screw rotatably mounted to said cranking disc and threadably engaged with said cranc pin, rotation of said further screw causing radial movement of said crank pin with respect to said cranking disc.

* * * * *